Nov. 26, 1963   J. M. ROBERTS   3,111,879
REFLEX FIDUCIAL MARKER IN A FRAMING CAMERA
Filed Sept. 27, 1961   2 Sheets-Sheet 1

INVENTOR.
James M. Roberts
BY
S. J. Rotondi & A. J. Dupont

Nov. 26, 1963
J. M. ROBERTS
3,111,879
REFLEX FIDUCIAL MARKER IN A FRAMING CAMERA
Filed Sept. 27, 1961
2 Sheets-Sheet 2
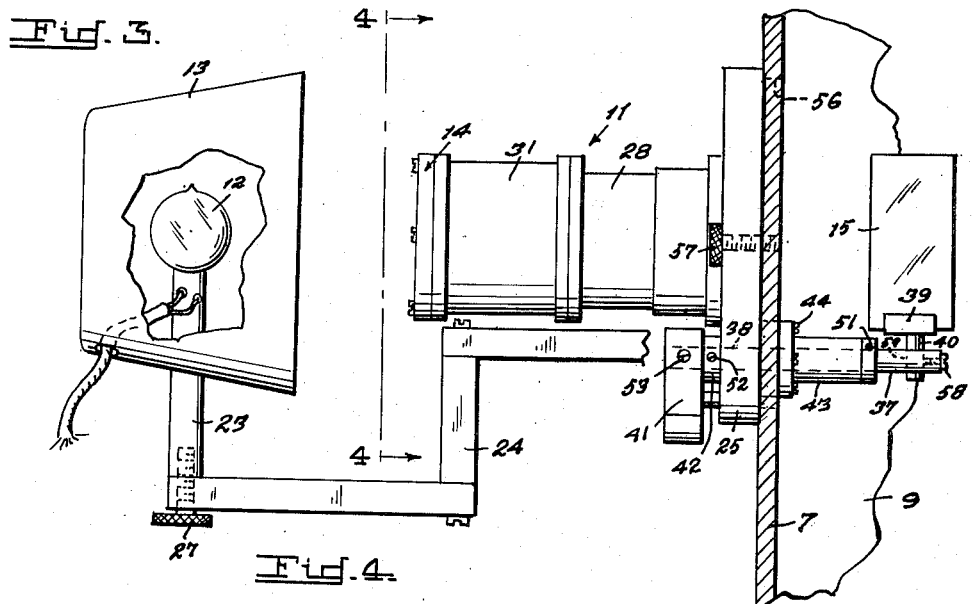
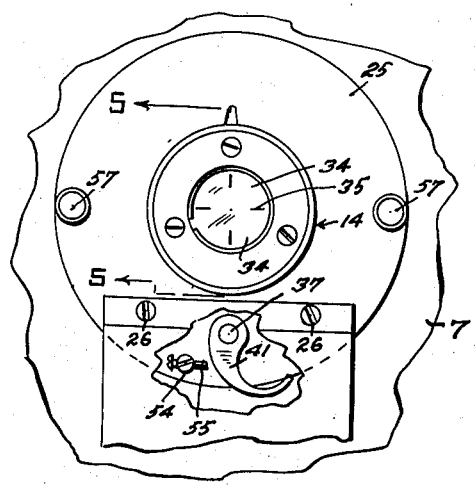
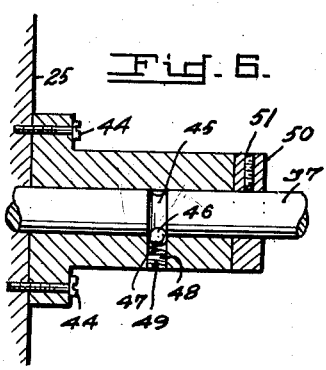
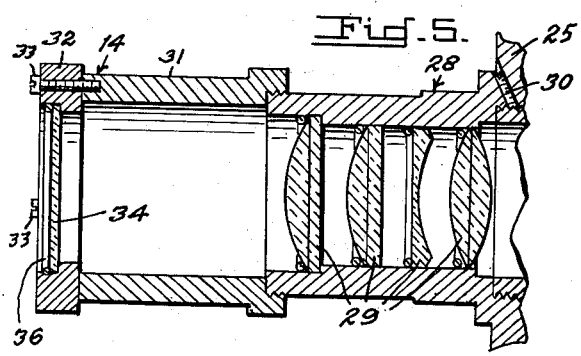
INVENTOR.
James M. Roberts
BY
S. J. Rotondi & A. J. Dupont

United States Patent Office 3,111,879
Patented Nov. 26, 1963

3,111,879
REFLEX FIDUCIAL MARKER IN A
FRAMING CAMERA
James M. Roberts, 603 Walker St., Aberdeen, Md.
Filed Sept. 27, 1961, Ser. No. 141,225
3 Claims. (Cl. 88—16)
(Granted under Title 35, U.S. Code (1952), sec. 266)

The invention described herein may be manufactured and used by or for the Government for governmental purposes without the payment to me of any royalty thereon.

This invention relates to a reflex fiducial marker and more particularly to the placing of reference marks on the 25 frames of film in a framing camera of the Beckman and Whitley model 189 framing camera type to facilitate animation for motion picture studies of an event such as an explosion.

Heretofore, in an attempt to place reference marks on photographs of an event taken by cameras of this type, a reference system was constructed of a rectangular frame of wood and four inwardly directed pins placed at the center of each side of the frame and the assembly was placed in front of the main lens of the camera.

When the event to be photographed was, for instance, an explosion, the wooden reference assembly was bounced around and destroyed if it was placed near the explosion. If it was placed a safe distance from the explosion, it would not be in focus and hence would not serve its intended purpose.

A system constructed of metal was tried and found to be somewhat better. However, the problem still remained of having to align the system before each event.

The idea was suggested of placing reference marks on each of the lens pairs which are located immediately in front of each of the 25 frames of film, but this was thought to be expensive and if it was desired to change the reference marks, more expense would be entailed.

It remained for the present invention to eliminate these objections by a comparatively inexpensive and fairly simple system which allows each of the 25 frames of film in the framing camera to receive light energy which has been directed through a piece of index marked film before the photographing of an event.

It is a primary object of this invention, therefore, to provide a reference marker for placing reference marks on the film frame of a framing camera.

It is another object of the invention to provide a reference marker for a framing camera by directing the energy of a light through a piece of index marked film onto a first mirror and a rotating mirror which will reflect the image from the first mirror onto a plurality of film frames.

It is still another object to quickly rotate the first mirror out of the path of light between the main lens path and the rotating mirror before photographing an event.

The specific nature of the invention as well as other objects and advantages thereof, will clearly appear from a description of a preferred embodiment as shown in the accompanying drawings in which:

FIG. 3 is a section taken along line 3—3 of FIG. 2 and looking in the direction of the arrows;

FIG. 4 is a view taken in the plane indicated by line 4—4 of FIG. 3 and looking in the direction of the arrows;

FIG. 5 is a section taken along line 5—5 of FIG. 4 and looking in the direction of the arrows; and, FIG. 6 is a detail section showing the manner of retaining the mirror operating shaft against lateral movement.

Figure 1:
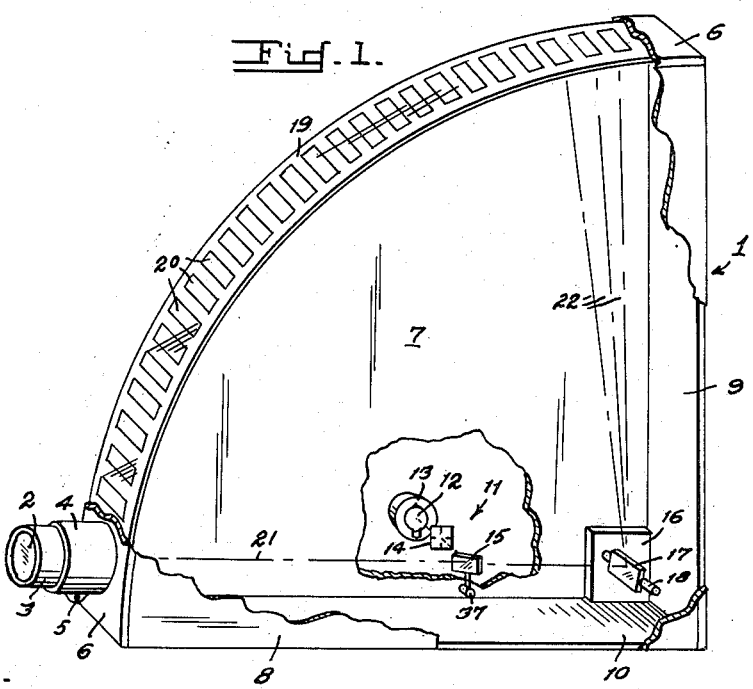
FIG. 1 is a perspective view of a framing camera and a part of the side walls broken away to expose the system for photographing the reference marks on the film.
Figure 2:
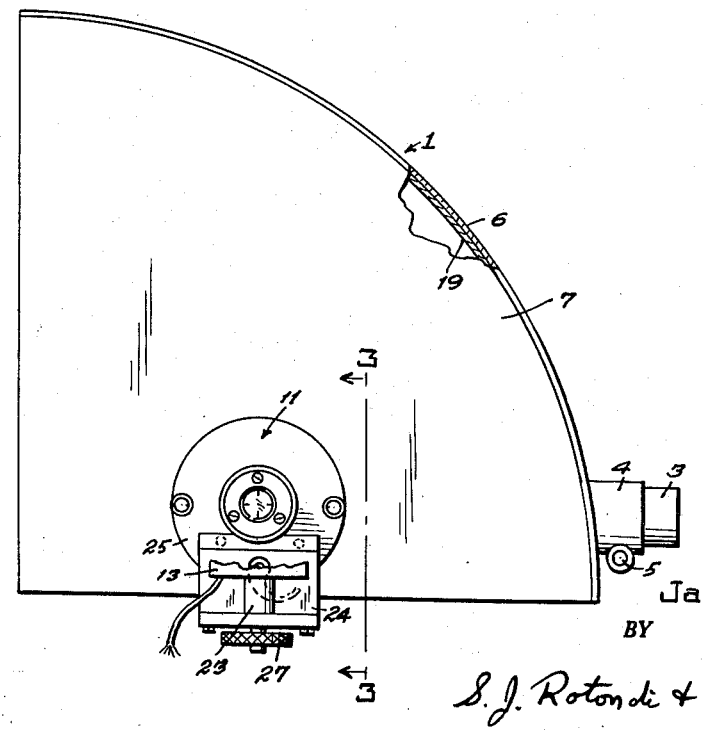
FIG. 2 is a view of the camera shown in FIG. 1 and looking at the other side thereof.

Referring more particularly to the drawing, reference character 1 indicates generally a framing camera of the Beckman and Whitley model 189 type.

Camera 1 is provided with a main objective lens 2 which is mounted for focusing in a tubular holder 3. Holder 3 is slidably mounted in tubular support 4 and held in a focused position by thumbscrew 5. Support 4 is mounted in the forward arcuate wall 6 of camera 1 extending through an arc of 90°.

Camera 1 is also provided with side walls 7 and 8, rear wall 9 and bottom wall 10.

The fiducial marker of the invention is indicated generally by 11 and is mounted in side wall 7 of camera 1 and is shown schematically in FIG. 1.

The marker 11 consists of a strobe lamp 12, reflector 13, index holder 14 and mirror 15.

Camera 1 is provided with a motor 16 (see FIG. 1) and a mirror 17 which is mounted on motor shaft 18.

The film to be used in the camera 1 is a stationary strip of film 19 having 25 frames 20, see FIG. 1.

This film is secured to the inner side of arcuate wall 6 by any suitable means, not shown.

In the normal operation of the camera 1, images of an event, such as an explosion, are admitted through objective lens 2 and follow a path 21 to mirror 17, which is rotated by shaft 18 of motor 16 and the image is reflected off mirror 17 as by paths 22 and onto frames 20 of film 19 in succession.

The fiducial marker 11 of the invention is seen more in detail in FIGURES 3–6. Reflector 13 supports strobe lamp 12 and is mounted on a shaft 23 which in turn, is mounted on the end of a bracket 24 fastened on the face of a mounting plate 25 by screws 26. Reflector 13 may be adjusted by rotating it in the desired position, then locked by set screw 27.

Index holder 14 (see FIG. 5) comprises a tubular focusing lens assembly 28 carrying lenses 29. The assembly is threadably mounted on mounting plate 25 by threads. A set screw 30 is provided for locking the assembly in focused position.

Threadably secured on the outer end of assembly 28 is an extension tube 31 which has an index carrying ring 32 fastened to tube 31 by screws 33. Ring 32 receives a frame of film 34 of the same size as frames 20 and containing markers 35. Film 34 is retained by a wire ring 36.

Mirror 15 is adjustably mounted on a shaft 37 which is journaled in a bore 38 in mounting plate 25. The mirror 15 is supported by a holder 39 and shaft 40 which is slidable in a bore 59 in shaft 37 and is locked in adjusted position by set screw 58.

Shaft 37 is provided with a lever 41 on its outer end for enabling the operator to rotate mirror 15 out of the path of the main lens 2 when desired.

Lever 41 is spaced from the mounting plate 25 by a spacer 42.

A retaining means is provided for preventing shaft 37 from too much play in bore 38 and consists of (see FIG. 6) a collar 43 fastened to the inner side of mounting plate 25 by screws 44. Shaft 37 is further provided with an annular groove 45 in which a ball 46 biased by a spring 47 in a bore 48 in collar 43 and the spring 47 is retained in bore 48 by a threaded closure 49.

A collar 50 having a set screw 51 is mounted on shaft 37 to aid in preventing displacement of shaft 37.

The shaft 37 is assembled by inserting it through bore 38 until ball 46 coincides with groove 45, then collar 50 is placed close to collar 43 and set screw 51 is tightened. Then spacer 42 is placed on shaft 37 close to mounting plate 25 and tightened by set screw 52. Lever 41 is then mounted and secured by set screw 53. Then the mirror 15 is mounted by inserting shaft 40 into bore 59 to the desired height for mirror 15 to receive light rays from lamp 12 and set screw 58 is tightened.

Means are provided to limit the rotation of mirror 15 and consists of a threaded head bolt 54 screwed into the outer face of mounting plate 25 and to one side of lever 41. An adjusting screw 55 threadably mounted transversely in head bolt 54 may be adjusted to limit rotation of mirror 15 by bearing against lever 41 to limit its movement.

The marker assembly 11 is mounted on the camera 1 as an entirety and is inserted into a circular bore 56 and secured by cap screws 57.

To photograph the index mark 35 on the 25 frames of film 20, the mirror 15 is rotated from its horizontal, "out of line of sight" position to a vertical "in the line of sight" position by means of the lever 41. The camera with the exception of mirror 15 being in its upright or vertical position, is now ready to photograph an event. However, instead of photographing the event, the camera 1 is made to photograph the index marked film 34. This is caused by energizing the strobe lamp 12 while, at the same time or shortly afterward, starting motor 16 that rotates mirror 17. Only one short flash is required from the strobe lamp 12 due to the high angular velocity of the rotating mirror 17. It will be seen from FIG. 1 that the flash from strobe lamp 12 passes through the index marked film 34, reflects off mirror 15 to the rotating mirror 17 and to each of the frames 20 of film 19 in succession. Each frame of film has now been exposed to receive a reference mark thereon which will allow accurate static motion picture studies to be conducted. It should be noted that since these reference marks were made using the same components of the camera that photograph an event, with the exception of the objective lens, any frame misalignment present will equally affect both the reference mark and the event itself thus compensating for the distortion experienced by the frames at each end of the arc.

After indexing film 19, the camera may be readied for photographing an event merely by rotating mirror 15 to a horizontal position.

Variations and modifications may be effected without departing from the scope of the novel concept of the present invention as set forth in the claims.

What is claimed is:

1. In combination, a framing camera having an arcuate front wall, a strip of film arranged arcuately along the inner surface of said wall, a first means for photographing an image on said film in said camera comprising, a main lens in the said front wall, a rotating reflector spaced from and in alignment with said main lens in said camera, said rotating reflector reflecting an image brought into focus thereon by said lens onto said film, a second means for photographing an index mark on said film in said camera comprising, a reflector mounted for movement in and out of the optical axis between said main lens and said rotating reflector, an index mark holder spaced from and in alignment with said last named reflector and a source of light spaced from and in alignment with said index mark holder, the light from said light source, when said light source is energized, being directed through said index mark holder and being reflected by said last named reflector and said rotating reflector and onto said film.

2. In combination, a framing camera including an arcuate front wall, a bottom wall, side walls, a back wall, a main lens in said front wall, a rotating mirror in said camera, said mirror being spaced from said main lens and a stationary strip of film having a series of frames thereon, said strip being disposed along the contour of the inner surface of said arcuate wall whereby upon rotation of said rotatable mirror an image brought into focus thereon by said main lens will be reflected by said rotatable mirror and reproduced on each of said frames on said film in succession, a fiducial marker attached to one of said side walls of said camera for marking index marks on said frames on said film comprising, a reflecting means moveable in and out of the path of light between said main lens and said rotating mirror in said camera, an indexing member spaced from and in alignment with said reflecting means when said reflecting means is disposed into said path of light and a light source spaced from and in alignment with said indexing member whereby when light from said light source is directed through said indexing member and reflected by said reflecting means and said rotating mirror each of said frames of film is exposed in succession.

3. In combination, a framing camera having an arcuate front wall, a bottom wall, side walls and a back wall, said front wall describing an arc of 90°, a strip of film having sequential frames mounted along the inner surface of said front wall, a first means for photographing an image on said frames comprising, an objective lens mounted in the front wall of said camera, a revolving mirror disposed in spaced relation and in axial alignment with said objective lens in said camera, said mirror projecting an image admitted through said objective lens onto said frames in sequence upon a revolution of 90°, a means for photographing a fiducial index mark on said frames prior to photographing an image thereon comprising, a reflector mounted for movement in and out of the path of light between said object lens and said revolving mirror, a focusing lens assembly fixed to one side of said camera and in alignment with said reflector when said reflector is in the path of light between said objective lens and said revolving mirror, an indexed frame of film fixed in spaced and axially aligned relation to said focusing lens assembly and a reflecting light source mounted on said focusing lens assembly, said light source being spaced from said indexed frame of film whereby when said light is energized, the rays therefrom will be projected through said frame of indexed film and said focusing lens and be reflected by said reflector, when in the path of light between said object lens and said revolving mirror, onto said revolving mirror and onto said frames of film in said front wall in sequence upon a revolution of 90° of said revolving mirror.

References Cited in the file of this patent
UNITED STATES PATENTS

| | | |
|---|---|---|
| 1,948,319 | Spence | Feb. 20, 1934 |
| 2,677,306 | Dodeman et al. | May 4, 1954 |
| 2,822,721 | Parker et al. | Feb. 11, 1958 |
| 3,044,068 | Hull et al. | July 10, 1962 |